United States Patent
Marella

(10) Patent No.: US 6,601,446 B1
(45) Date of Patent: Aug. 5, 2003

(54) CONTROL FIXTURE FOR A TIRE BEAD COMPRESSION TESTING MACHINE

(75) Inventor: Anthony Ross Marella, Wadsworth, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 10/243,641

(22) Filed: Sep. 4, 2002

(51) Int. Cl.⁷ .............................................. G01M 17/02
(52) U.S. Cl. ....................................................... 73/146
(58) Field of Search .......................... 73/8, 9, 146, 484, 73/862.042, 862.044, 862.045, 862.627; 51/165 R, 165.77, 281 R; 152/517, 541, 548, 550, 554, 555, 130.7, 133, 135, 406.4

(56) References Cited

U.S. PATENT DOCUMENTS

| | | | |
|---|---|---|---|
| 3,699,808 A | | 10/1972 | Ford et al. ...................... 73/91 |
| 3,789,899 A | * | 2/1974 | Kobayashi ................... 152/510 |
| 3,935,748 A | * | 2/1976 | Lannen ......................... 73/484 |
| 4,094,192 A | | 6/1978 | Watson et al. ............. 73/133 R |
| 4,216,916 A | * | 8/1980 | Tupper .......................... 241/36 |
| 4,320,791 A | * | 3/1982 | Fujii et al. ................... 152/540 |
| 4,918,983 A | | 4/1990 | Himmler ....................... 73/146 |
| 5,016,470 A | | 5/1991 | Himmler ....................... 73/146 |
| 5,020,357 A | | 6/1991 | Kovacevic et al. ........... 73/1 B |
| 5,795,416 A | * | 8/1998 | Willard et al. ............... 152/517 |
| 6,022,434 A | * | 2/2000 | Willard et al. ........... 156/130.7 |
| 6,035,709 A | | 3/2000 | Barnette, Jr. ................. 73/146 |
| 6,038,933 A | | 3/2000 | Meyer .................... 73/862.045 |

\* cited by examiner

Primary Examiner—William Oen
(74) Attorney, Agent, or Firm—Renner, Otto, Boisselle & Sklar, LLP

(57) ABSTRACT

A control fixture (20) for a tire-bead compression testing apparatus comprising a plurality of radially movable segments and force-sensing instrumentation contained in at least some of these segments. The control fixture (20) comprises a plurality of plunger assemblies (24) and each plunger assembly (24) includes a plunger (32) for attachment to one of the radially movable segments, a casing (34) for sliding receipt of the plunger (32), and a spring (36) positioned between the plunger (32) and the casing (34). In this manner, force-sensing instrumentation can be used to determine the spring constant of the spring (36) and the consistency of the apparatus thereby confirmed.

14 Claims, 4 Drawing Sheets

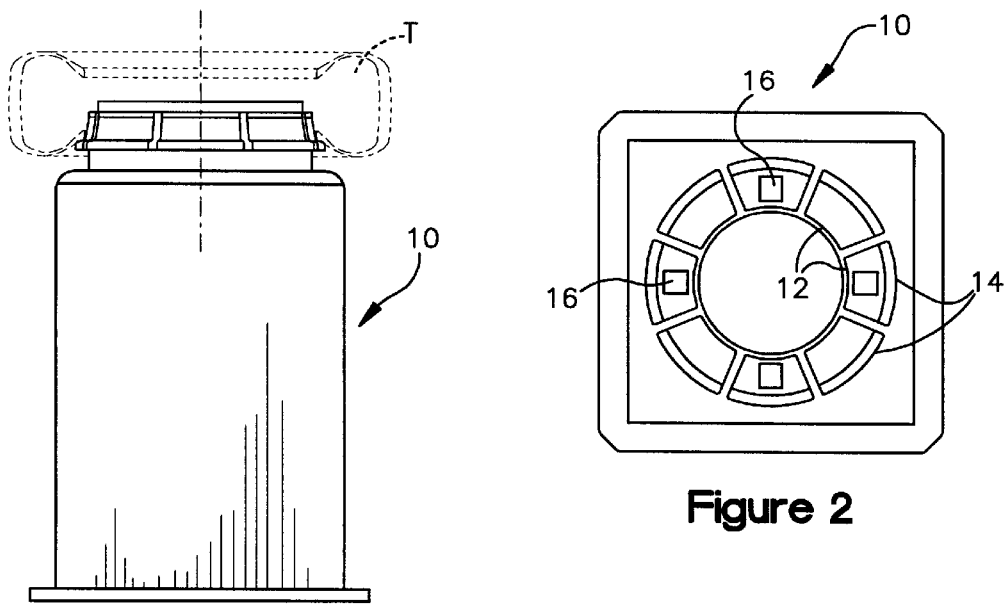
Figure 1
Figure 2
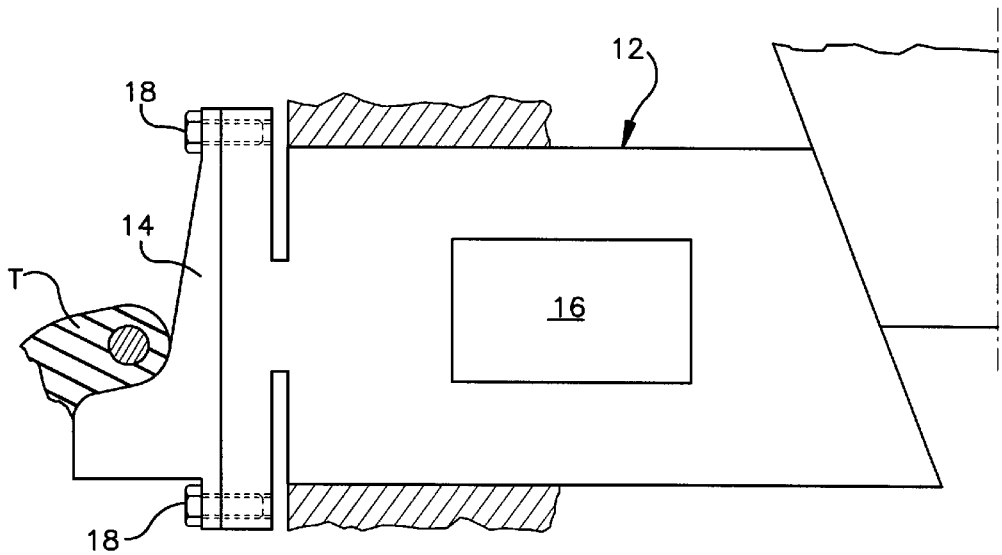
Figure 3

CONTROL FIXTURE FOR A TIRE BEAD COMPRESSION TESTING MACHINE

FIELD OF THE INVENTION

The present invention relates to a control fixture for a tire bead compression testing machine.

BACKGROUND OF THE INVENTION

In the manufacture of tires, "bead contact pressure" (i.e., the pressure at which the tire is carried on the wheel rim) is an important parameter. This pressure must be high enough to overcome the forces encountered when the vehicle is traveling at high speeds or negotiating a turn, but not so high as to prevent removal of the tire from the rim. Accordingly, quantifying bead compression characteristics is often an important part of tire testing procedures.

A conventional apparatus for determining bead compression characteristics comprises a plurality of clamp segments (e.g., eight) distributed around the circumference of a circle and mounted for selective radial movement. The clamp segments are shaped to collectively form a clamping jaw which approximates the geometry of a wheel rim. Force-sensing instrumentation (e.g., a load cell) is attached to at least some of the clamp segments. A tire is placed in a horizontal orientation on the apparatus with the to-be-checked bead positioned downwardly. The clamp segments are then moved radially outward (preferably simultaneously and for the same distances) and resistance of the tire against this movement is measured by the force-sensing instrumentation. In this manner, bead compression characteristics can be quantified for the tire.

SUMMARY OF THE INVENTION

The present invention provides a control fixture for checking a bead compression testing apparatus to ensure test-to-test consistency.

More particularly, the present invention provides a control fixture comprising a plurality of plunger assemblies. Each plunger assembly includes a plunger, a casing for sliding receipt of the plunger, and a spring positioned between the plunger and the casing. To confirm the consistency of the tire-bead compression testing apparatus, each plunger is attached to a respective one of the radially movable segments. The segments are moved outward, and the spring constant of each of the springs is measured with the force-sensing instrumentation.

The present invention provides these and other features hereinafter fully described and particularly pointed out in the claims. The following description and drawings set forth in detail certain illustrative embodiments of the invention. These embodiments are indicative, however, of but a few of the various ways in which the principles of the invention can be employed.

DRAWINGS

FIG. 1 is a side view of a bead compression checking apparatus.

FIG. 2 is a plan view of the bead compression checking apparatus.

FIG. 3 is a partly sectional view of a portion of the bead compression checking apparatus.

DETAILED DESCRIPTION

Figure 4:
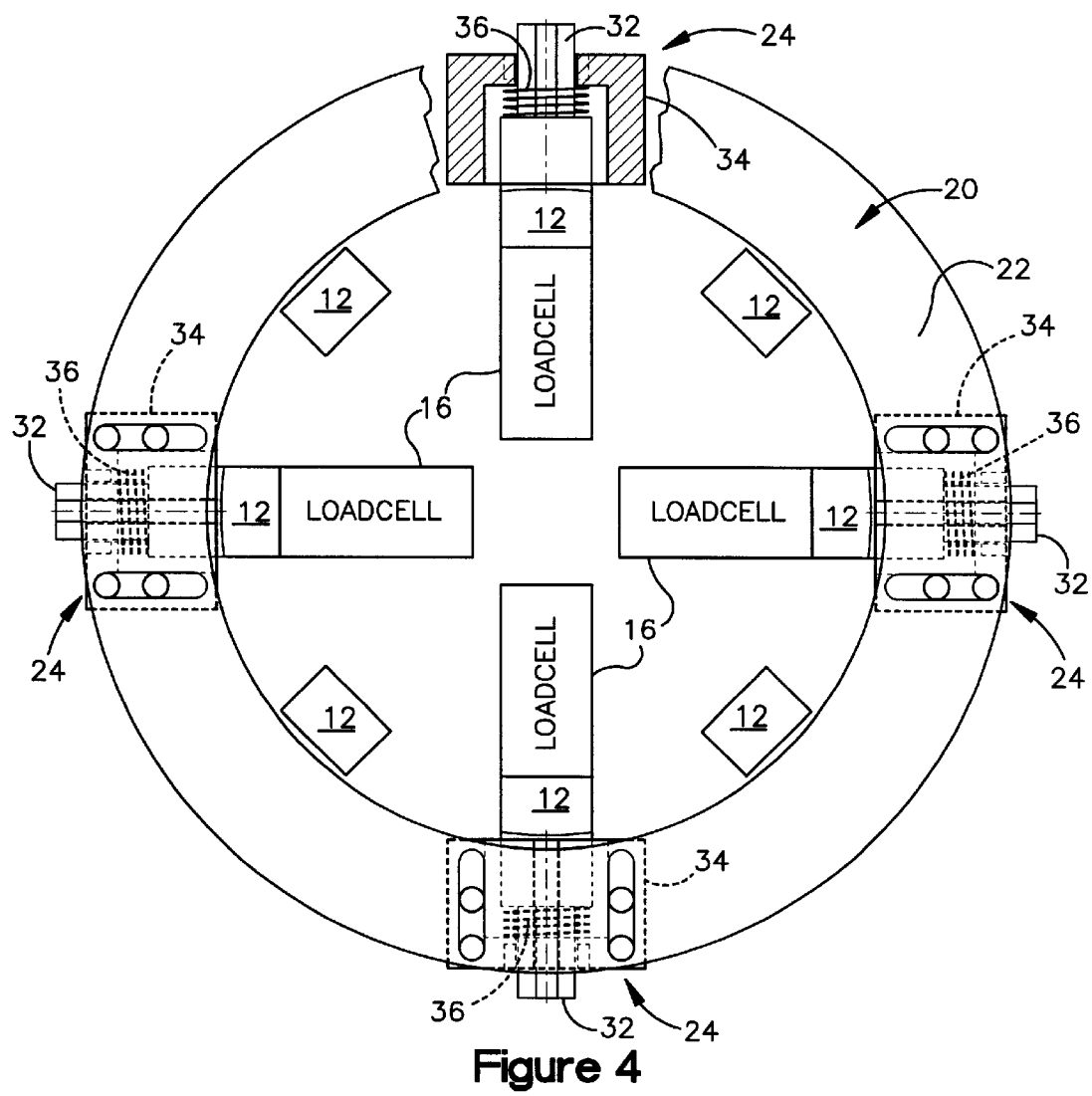
FIG. 4 is a top schematic view of a control fixture according to the present invention installed on the bead compression checking apparatus.

Referring now to the drawings, and initially to FIGS. 1–3, a bead compression checking apparatus 10 is schematically shown. The apparatus 10 comprises a plurality of segments 12 (e.g., eight) distributed around the circumference of a circle and mounted for selective radial movement. (FIG. 2.) The segments 12 each include a clamp 14 and at least some of the segments 12 include force-sensing instrumentation 16 (e.g., load cells). The clamps 14 are shaped to collectively form a clamping jaw which approximates the geometry of a wheel rim. (FIG. 2.) In the illustrated embodiment, instrumentation 16 is attached to every other clamp 14 (e.g., four of the eight segments) with fasteners 18. (FIG. 3.)

A tire T is placed in a horizontal orientation on the apparatus 10 with the to-be-checked bead B positioned downwardly. (FIG. 1.) The segments 12 are then moved radially outward and the resistance of the tire T against this movement is measured by the force-sensing instrumentation 16. In this manner, bead compression characteristics can be quantified for the tire T.

Figure 5:
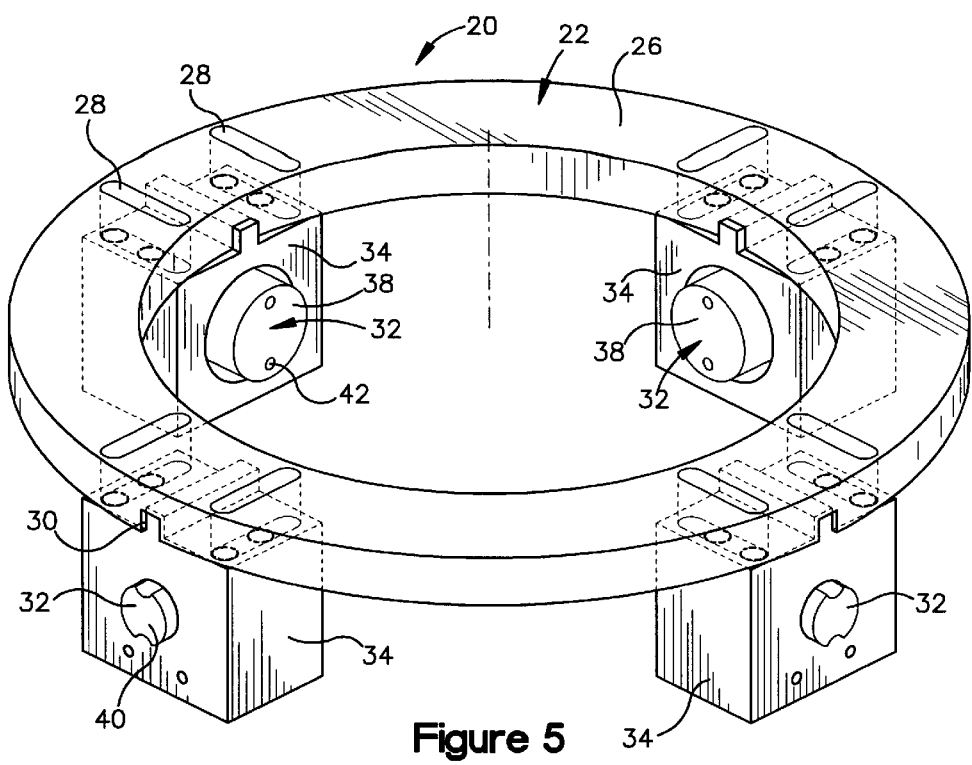
FIG. 5 is a perspective view of the control fixture.

Referring now to FIGS. 4 and 5, the present invention provides a control fixture 20 for checking the apparatus 10 to ensure test-to-test consistency. The illustrated control fixture 20 comprises a locating bracket 22 and a plunger assembly 24 (e.g., four) for each of the segments 12 having force-sensing instrumentation 16 attached thereto. As explained in more detail below, the control fixture 20 is aligned with the direction of motion, provides a repeatable mounting arrangement, and accounts for all force-sensing instrumentation simultaneously.

Figure 6A:
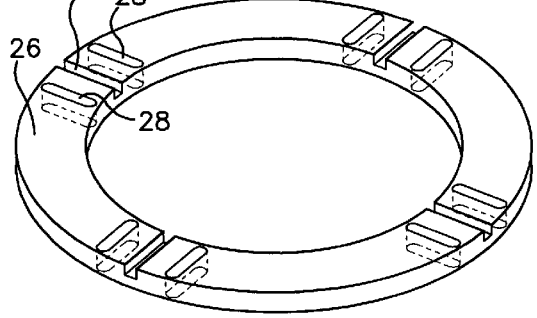
FIGS. 6A, 6B and 6C are top, side and perspective views, respectively, of a component of the control fixture, namely a locating bracket.
Figure 6B:
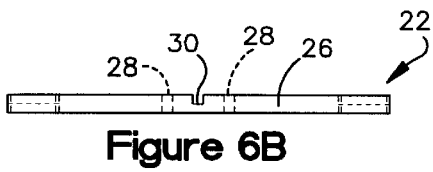
Figure 6C:
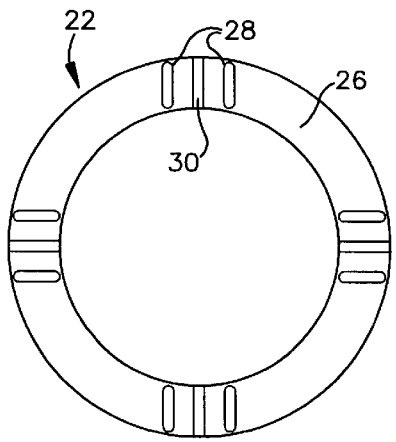
Figure 7A:
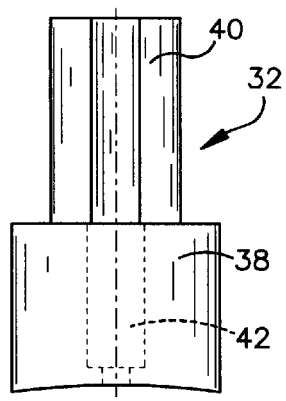
FIGS. 7A, 7B, 7C and 7D are top, front, side, and perspective views, respectively, of another component of the control fixture, namely a plunger.
Figure 7D:
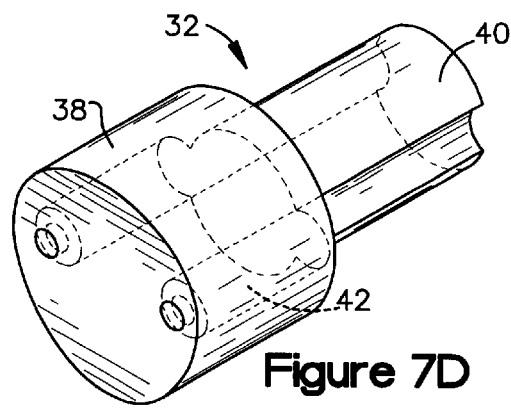
Figure 7B:
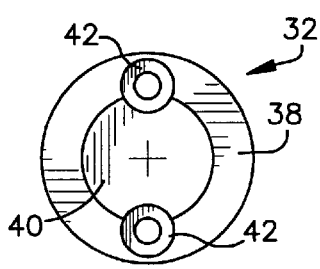
Figure 7C:
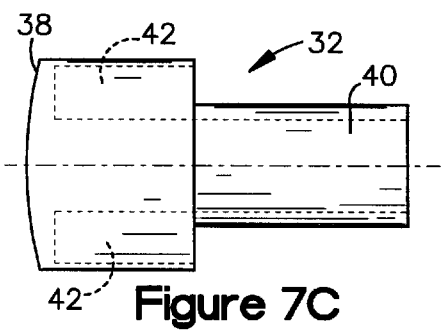
Figure 8A:
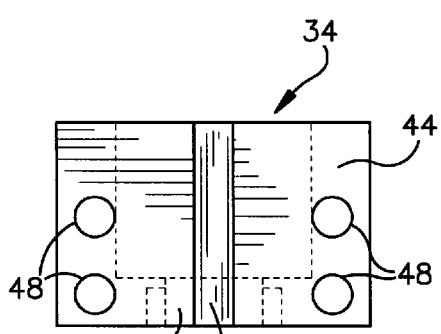
FIGS. 8A, 8B, 8C and 8D are top, front, rear and perspective views, respectively, of another component of the control fixture, namely a plunger-receiving case.
Figure 8D:
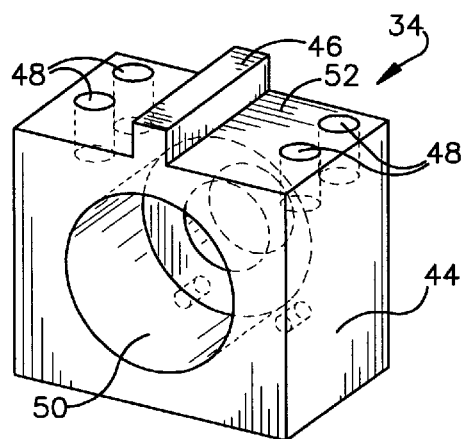
Figure 8B:
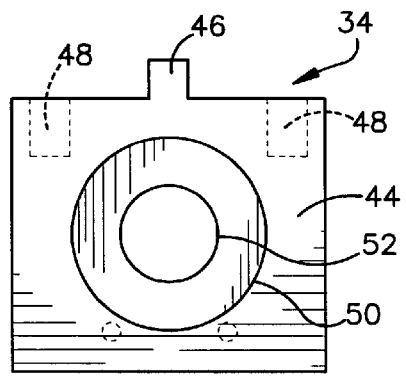
Figure 8C:
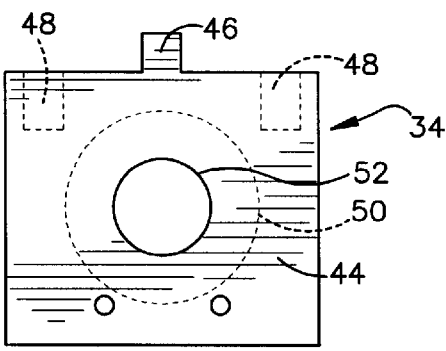

The locating bracket 22 is shown isolated from the other components of the control fixture 20 in FIGS. 6A–6C. The illustrated bracket 22 comprises a ring-shaped body 26 having alignment/attachment elements for each of the plunger assemblies 24. Specifically, the illustrated bracket 22 includes four sets of a pair of oval through-slots 28 and a rectangular groove 30 therebetween.

Each plunger assembly 24 includes a plunger 32, a receiving case 34, and a spring 36. The preferred plunger 32, shown in FIGS. 7A–7D isolated from the rest of the fixture components, comprises a wide front cylindrical portion 38 and a narrow rear cylindrical portion 40. As explained in more detail below, the plungers 32 are attached to the segments 12, whereby the wide cylindrical portion 38 can have a curved front wall (see FIG. 7A). Also, diametrically opposed cylindrical bores 42 can extend axially through the front portion 38 and continue as semi-cylindrical slots through the rear portion 40. The bores 42 can be positioned for alignment with the fasteners 18 used to attach the clamps 14 to the portion of the clamps 12 containing the instrumentation 16.

The illustrated receiving case 34, shown in FIGS. 8A–8D isolated from the rest of the fixture components, comprises a block-shaped body 44 having elements on its top wall for alignment/attachment with the locating bracket 22. Specifically, the case 34 includes a rectangular notch 46 sized for receipt in the bracket's groove 30, and fastener openings 48 positioned for alignment with the bracket's slots 28. The receiving case 34 also includes a stepped bore extending from its front wall to its back wall. The bore includes a wide front portion 50 sized to receive the plunger's front portion 38, and a narrower rear portion 52 sized to receive the plunger's rear portion 40.

The spring 36 can comprise a single spring or a set of springs positioned between the plunger 32 and the receiving case 34. For example, the spring 36 can comprise a set of six spring washers arranged in series. The spring washers are sized so that they have a diameter between that of the wide portions 38/50 and the narrow portions 40/52 of the plunger 32 and the case 34.

To install the control fixture 20, the clamps 14 are removed and the plungers 32 are attached to the appropriate segments 14 (i.e, the segments containing instrumentation 16) by fasteners inserted through the bores 42. The springs 36 are positioned within the wide front bore portion 50 of the case 34 and the plunger 32 is inserted (by movement of the case 34) into the case 34. The receiving cases 34 are secured to the locating bracket 22 with fasteners which extend through the bracket's slots 28 into the case's openings 48. The rectangular groove 30 of the bracket 22 and the rectangular notch 46 of the case 34 are used for alignment purposes.

Once the control fixture 20 has been installed; the apparatus 10 is activated to expand the segments 12 in the same manner as done while performing a tire bead compression test. The force and displacement on each of the load cells is measured and, upon full expansion, the spring constant is calculated for each of the plunger assemblies 22. By determining that these spring constants fall within a certain range, the consistency of the apparatus 10 can be confirmed One may now appreciate that the control fixture 20 of the present invention is aligned with the direction of motion of the apparatus 10, whereby it provides higher accuracy in measuring forces and displacement. Also, the control fixture 20 allows a mounting arrangement which provides for reliable repeating of checking procedures. Furthermore, the control fixture 20 accounts for all force transducers simultaneously, thereby decreasing the time of operation and requiring only one installation process.

Although the invention has been shown and described with respect to certain embodiments it is obvious that equivalent alterations and modifications will occur to others skilled in the art upon the reading and understanding of this specification. The present invention includes all such alterations and modifications and moreover is limited only by the scope of the following claims.

What is claimed is:

1. A control fixture for a tire-bead compression testing apparatus comprising a plurality of radially movable segment and force-sensing instrumentation contained in at least some of these segments, said control fixture comprising a plurality of plunger assemblies, each plunger assembly comprising:

a plunger for attachment to one of the radially movable segments;

a casing for sliding receipt of the plunger; and a spring positioned between the plunger and the casing, whereby the force-sensing instrumentation can be used to determine the spring constant of the spring and the consistency of the apparatus thereby confirmed.

2. A control fixture as set forth in claim 1, wherein said control fixture further comprises a locating bracket to which the casing is attached.

3. A control fixture as set forth in claim 2, wherein the locating bracket comprises a ring-shaped body having alignment/attachment elements for each of the plunger assemblies.

4. A control fixture as set forth in claim 1, wherein the case has a bore, wherein a portion of the plunger is positioned within the bore, and wherein the spring is positioned around the plunger's portion within the bore.

5. A control fixture as set forth in claim 4, wherein said control fixture further comprises a locating bracket to which the casing is attached.

6. A control fixture as set forth in claim 5, wherein the locating bracket comprises a ring-shaped body having alignment/attachment elements for each of the plunger assemblies.

7. A control fixture as set forth in claim 6, wherein said control fixture comprises four plunger assemblies.

8. A control fixture as set forth in claim 1, wherein said control fixture comprises four plunger assemblies.

9. In combination, the control fixture set forth in claim 1 and a tire-bead compression testing apparatus comprising a plurality of radially movable segments and force-sensing instrumentation attached thereto; wherein the plungers are attached to the radially movable segments.

10. The combination set forth in claim 9, wherein the radially movable segments each include a clamp, wherein at least some of the radially movable segments contain the force-sensing instrumentation, and wherein the plungers are attached to the radially movable segments containing the force-sensing instrumentation.

11. A method of using the control fixture of claim 1 to confirm the consistency of the tire-bead compression testing apparatus, said method comprising the steps of:

attaching each plunger to a respective one of the radially movable segments;

moving the radially movable segments outward; and measuring the spring constant of each the springs with the force-sensing instrumentation.

12. A method as set forth in claim 11, further comprising the step of determining whether the spring constants fall within a predetermined range.

13. A method of checking a tire-bead compression testing apparatus comprising a plurality of radially movable segments and force-sensing instrumentation attached thereto, said method comprising the steps of:

attaching a plunger to at least one of the radially movable segments;

moving the radially movable segments radially outwardly;

placing a spring so that it is compressed as the plunger is moved radially outward;

measuring the spring constant of the spring; and using the spring constant to confirm the consistency of the apparatus.

14. A method as set forth in claim 12, comprising the attachment of a plunger to a plurality of the radially movable segments.

* * * * *